J. W. COCHRAN.
Ore Mill.
No. 11,988.          Patented Nov. 28, 1854.
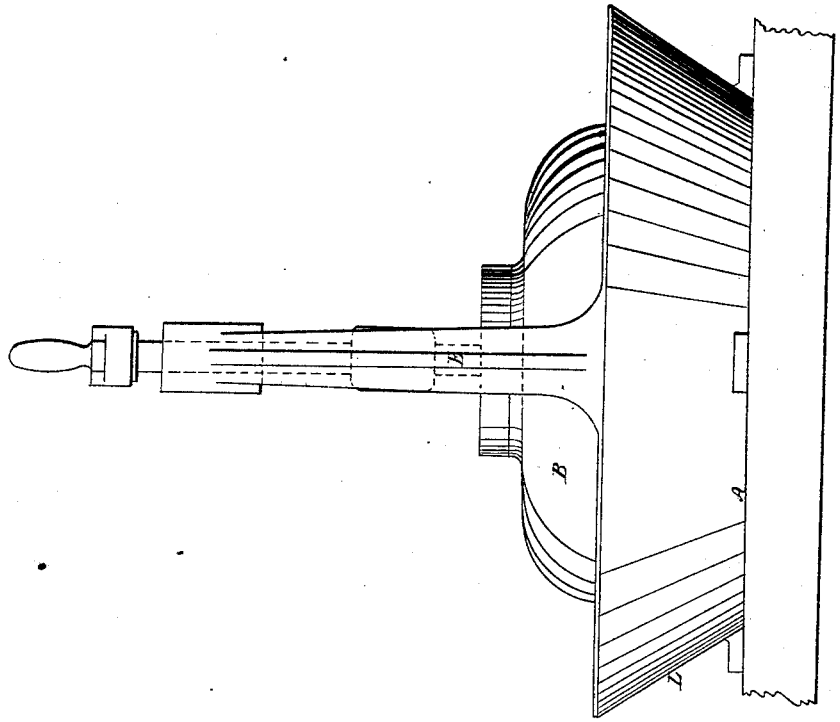
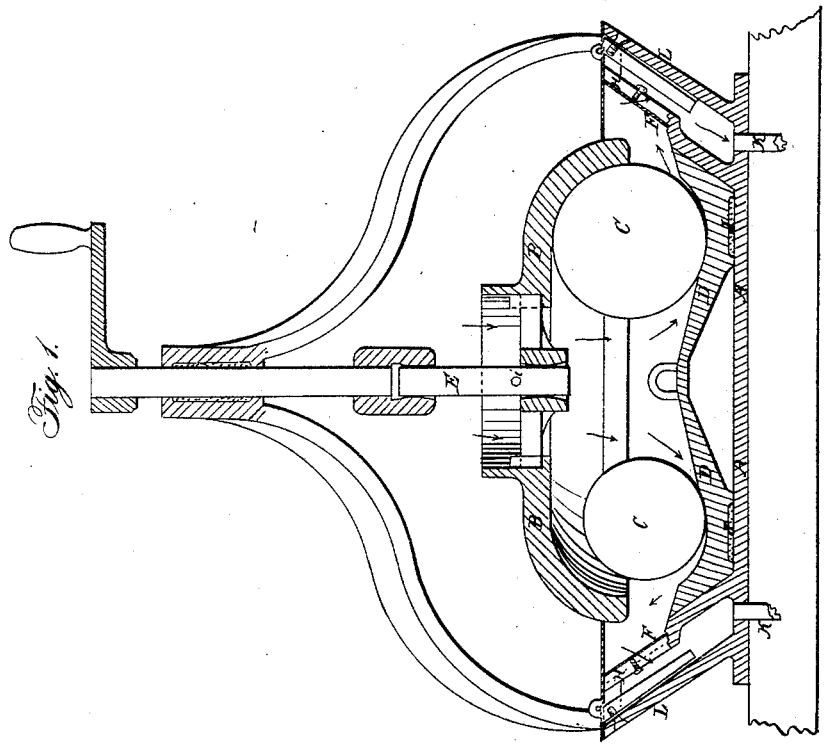

UNITED STATES PATENT OFFICE.

J. W. COCHRAN, OF NEW YORK, N. Y.

IMPROVED QUARTZ-CRUSHER.

Specification forming part of Letters Patent No. 11,988, dated November 28, 1854.

*To all whom it may concern:*

Be it known that I, JOHN W. COCHRAN, of the city, county, and State of New York, have invented new and useful Improvements in Machines for Crushing and Grinding Quartz, Rock, Stone, and other Materials Required to be Crushed or Ground; and I do hereby declare that the following is a full and exact description thereof.

In constructing my machines I employ a stationary foundation-plate flanged or curbed at its outer edge or periphery. At a suitable distance from the outer edge of this plate a groove or grooves are made surrounding the plate. In the groove I place a number of balls or shells, usually six in number, each alternate ball being of smaller size. Motion is given to these balls by a second plate or disk similar in form to the foundation-plate. This second plate is inverted and rests upon the balls, and when motion is given to this second or revolving plate its weight and traction give motion to the balls upon which it rests and causes them to revolve in the grooves between the two plates with both a rolling and grinding motion. The office of the smaller balls is not so much for the grinding effect as for the purpose of keeping the balls from grinding and wedging together, for while they revolve around between the two plates in the same direction with the larger balls on their own centers they revolve in a contrary direction and act as intermediates to the larger balls, upon which the revolving plate only rests. To the curb of the foundation-plate a suitable frame-work is connected, which rises above the revolving plate for the purpose of forming bearings for the driving-shaft. The driving-shaft is not connected directly with the revolving plate. The revolving plate is cast with a square hole or socket in the center, as is also the lower end of the driving-shaft. The driving-shaft and revolving plate are coupled or connected together by a shaft or bolt which fits into the sockets of the driving-shaft and revolving plate, and this connecting shaft or bolt is held in position by a pin passed through it, whose ends project and rest upon the top of the socket of the revolving plate. This arrangement of coupling or connection gives freedom of play to the revolving plate, both laterally and vertically, caused by the balls passing over hard substances without readily crushing them and without affecting the bearings of the driving-shaft, the shaft or bolt working in the sockets acting as a universal joint. The revolving plate surrounding this universal joint is left with openings for passing the quartz or other material into the machine.

In order to renew the efficacy of my machines, the interior part of the foundation plate or disk is made of a separate piece, which can be removed and renewed at pleasure. This piece I call a "die" or "bushing" and extends to the outside of the groove, in which the balls revolve, and is made to fit firmly into the stationary part of the machine, and at the point or place where it rests I underline it with india-rubber or other elastic material to make it fit and bear more uniformly, and also act as a cushion to reduce the effect of the concussion of the balls and revolving plate in grinding hard substances. The revolving plate may also be made in the same manner; but I do not find it so necessary or essential as the stationary plate. Either or both of these dies or bushings may be cast hollow to receive steam to keep the machine at a proper temperature in grinding oil-seeds or other substances, if required.

Between the outside curb of the foundation-plate and the revolving plate I place a screen of wire-gauze or perforated sheet metal to retain the material being ground in contact with the balls till it is of suitable fineness to pass through the screen. I secure this screen in panels in the following manner: According to the length of the panels I erect standards secured to the outside curb and foundation-plate of the machine. The inside of these standards is grooved or cut out in order to receive a separate piece of the size of the part cut out. This separate piece is held in the groove by a screw-bolt passing through from the back part of the standard. Before the piece is drawn close into the groove the panels are slipped in between the standards and the piece, when the piece is drawn into the groove, where it clips hold of the ends of the gauze-panel and secures them tightly to the standards, and at the same time stretches them so as to give a smooth and uniform surface to the entire circumference of the screen. The machine being put in motion, the quartz or other material is passed through the openings in the revolving plate and comes in contact with the balls, where it is kept in contact with them till it is of a suitable fineness to pass through the screen, from whence it is conducted to any required place by the tubes placed between the screen and outside curb in the bottom of the machine.

In the accompanying drawings, Figure 1 shows a vertical section, and Fig. 2 a side elevation, of the machine; and like letters refer to like parts.

A is the foundation-plate, B the revolving plate, and C C the balls of both sizes.

D is the die or bushing resting upon an india-rubber lining or other elastic substance, the position of which lining is shown at J.

H H show the standards for holding the screen, and F F show the screen held to the standards by means of the screw and clipping or binding piece; L L, the outside curb of the foundation-plate, and K K the spouts for carrying off the ground substances, and, if mineral or metallic substances, are generally ground or floated off in water.

E shows the coupling or connecting shaft or bolt fitting loosely into the sockets of the revolving plate and driving-shaft, held in position by the ends of the pin $i$, forming thereby the universal coupling-joint which allows both a vertical and horizontal vibration of the rotary or revolving plate without disturbing the bearings of the driving-shaft.

Having described my invention, what I claim and desire to secure by Letters Patent, is—

1. The movable dies or bushings, either with or without the india-rubber or other elastic interlining or cushion, in combination with the revolving disk or plate and balls or shells, substantially as described.

2. The manner of arranging and stretching the wire gauze or screen in panels and securing them to the standards, so as to give a uniform surface to the inner surface of the screen.

3. The connecting-shaft for coupling the driving-shaft with the revolving plate or disk, admitting the revolving plate or disk to vibrate laterally or vertically without affecting the driving-shaft or its bearings, combined and operated substantially as described.

J. W. COCHRAN.

Witnesses:
   A. B. HOWE,
   GEO. H. ALBUTT.